Nov. 3, 1936.　　　H. E. ALTGELT　　　2,059,676
TRACTOR POWER LIFT AND IMPLEMENT
Filed Aug. 7, 1933　　　3 Sheets-Sheet 1
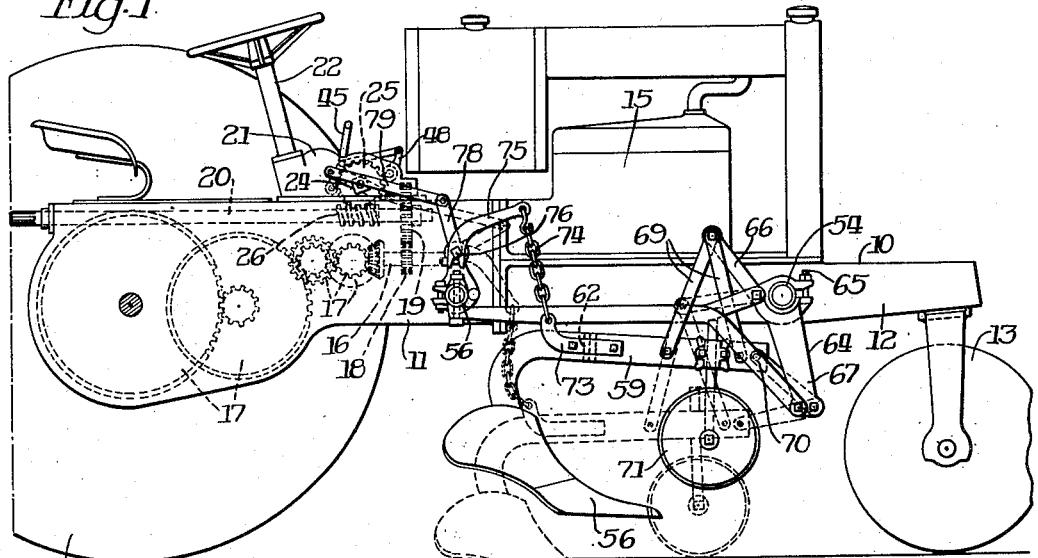
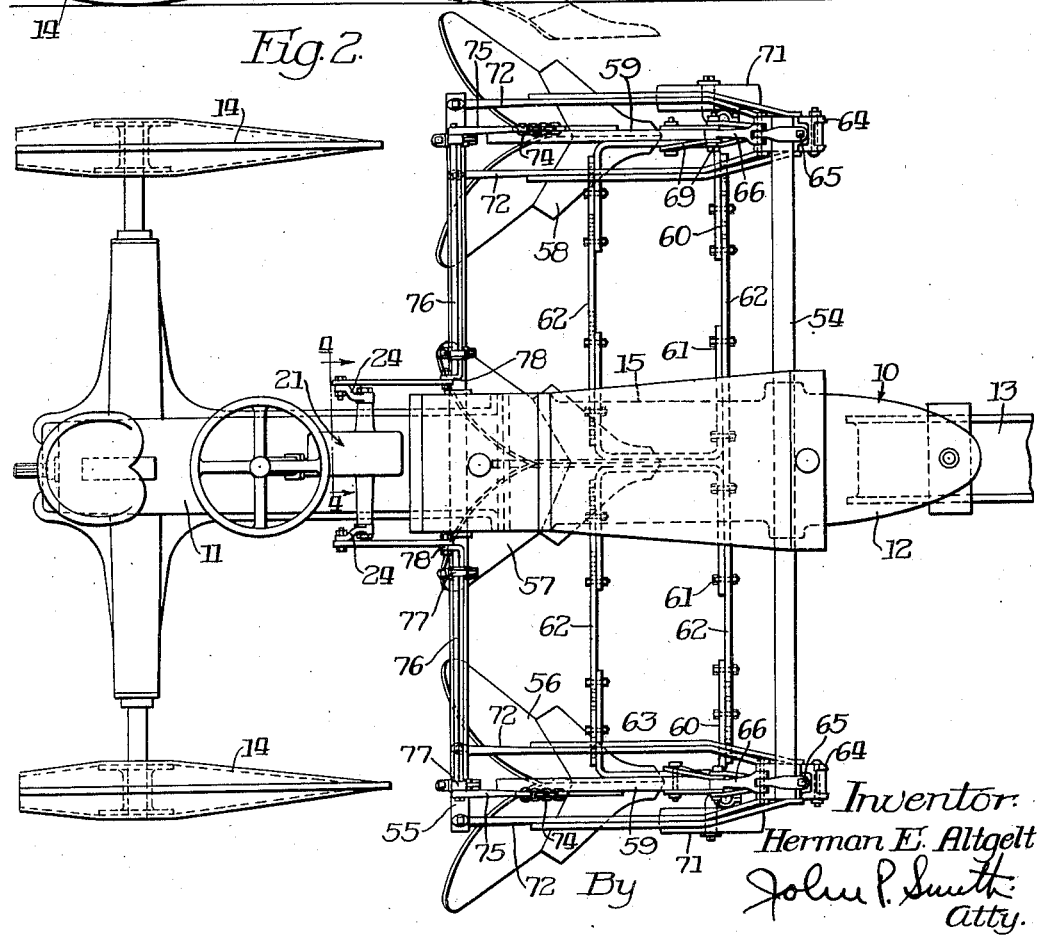
Inventor:
Herman E. Altgelt
By John P. Smith
Atty.

Nov. 3, 1936.  H. E. ALTGELT  2,059,676
TRACTOR POWER LIFT AND IMPLEMENT
Filed Aug. 7, 1933  3 Sheets-Sheet 2
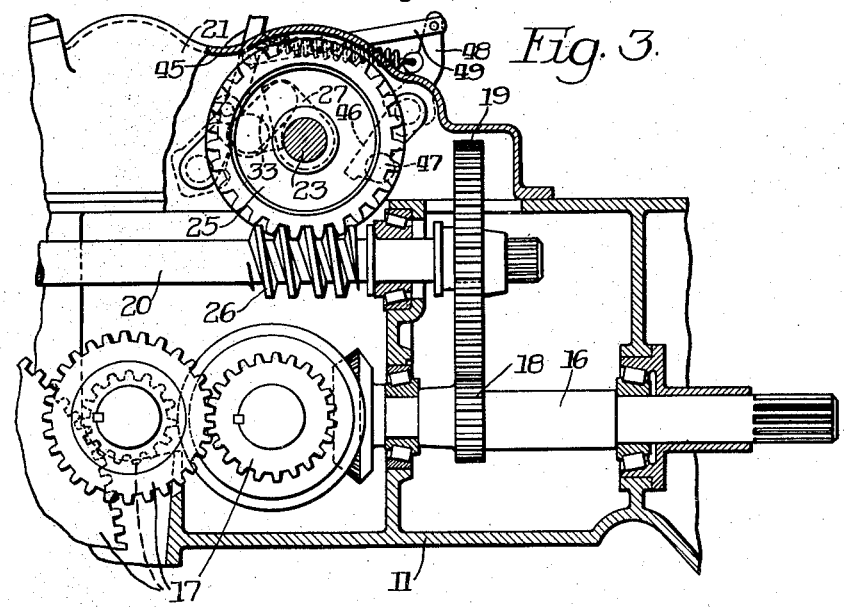
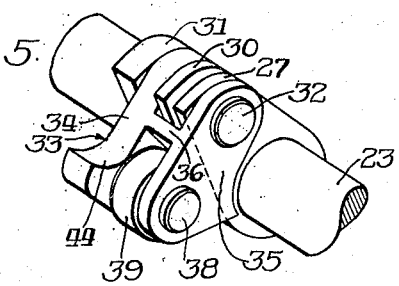
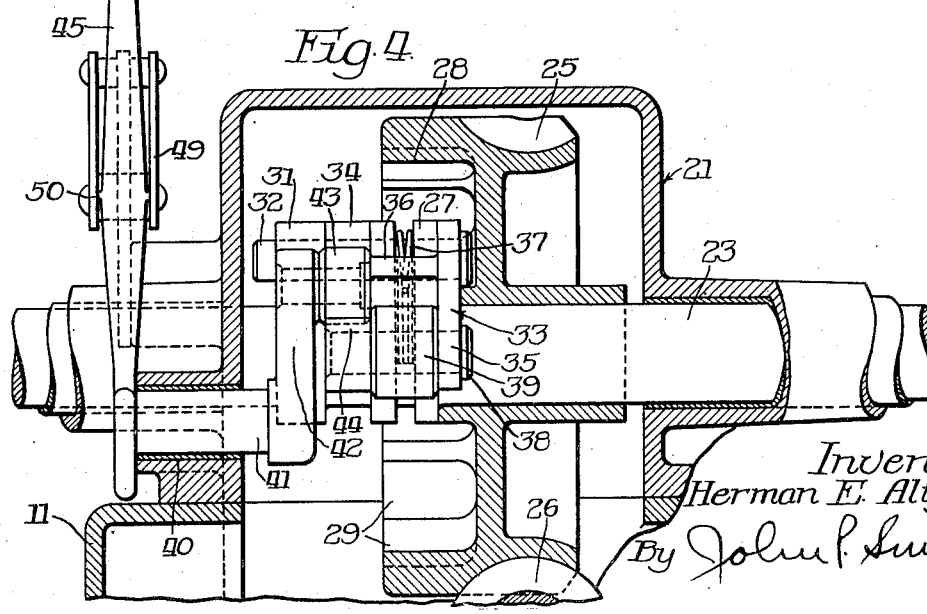
Inventor:
Herman E. Altgelt.
By John P. Smith
Atty

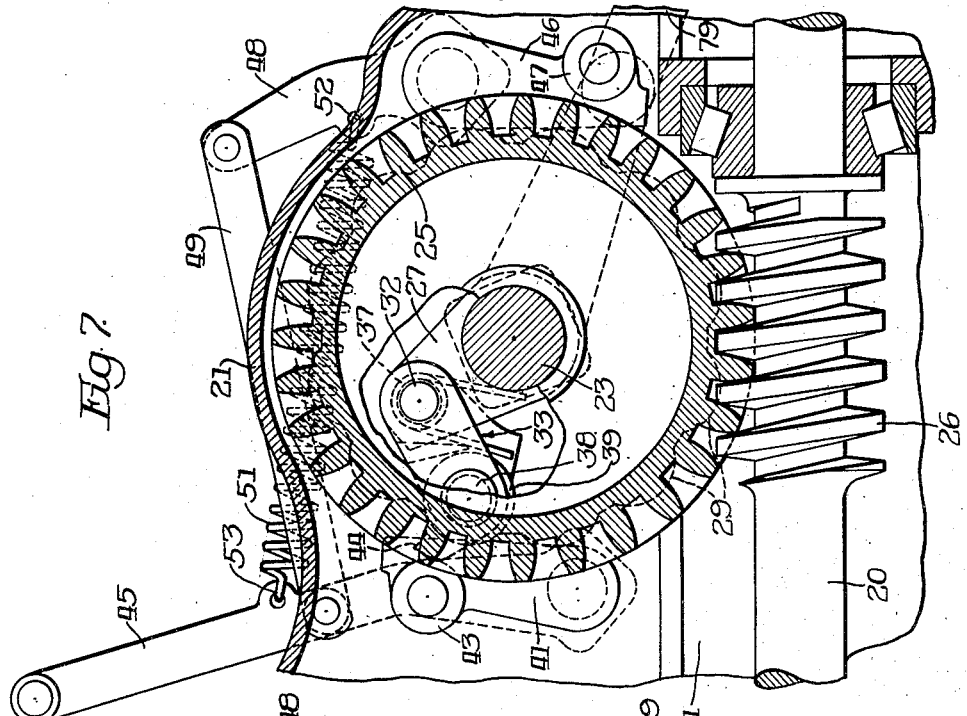
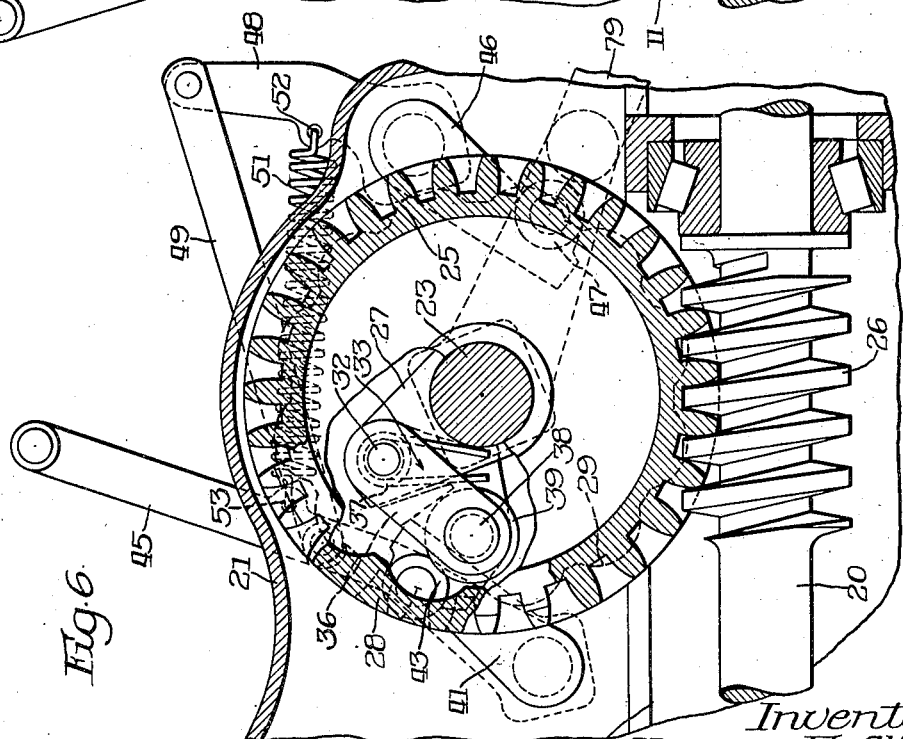

Patented Nov. 3, 1936

2,059,676

UNITED STATES PATENT OFFICE 2,059,676

TRACTOR POWER LIFT AND IMPLEMENT

Herman E. Altgelt, South Bend, Ind., assignor to Oliver Farm Equipment Company, a corporation of Delaware Application August 7, 1933, Serial No. 683,949

15 Claims. (Cl. 97—50)

The invention relates generally to tractor power lift implements, but more particularly to a simplified construction of power lift mechanism located conveniently with respect to the transmission mechanism of the tractor and in close proximity with the lifting operative connection of the implement attached to the tractor.

One of the primary objects of the present invention is to provide a novel, simplified and compact power lift mechanism for a tractor connected to the forward end and above the power take-off shaft so that relatively short connections are required for operatively connecting the power lift device with the implements attached to the tractor.

A further object of the invention is to provide a novel and improved tractor power lift mechanism in combination with a single frame three row middle buster in which the frame thereof is located between the front steering and rear traction wheels of the tractor and extends underneath the tractor frame and is supported by two gauge wheels adjustably carried at the opposite sides of the frame.

A further object of the invention is to provide a novel and improved tractor power lift mechanism which forms a unit with the steering post mechanism so that all the parts thereof may be assembled together before it is mounted on the tractor frame.

A still further object of the invention is to provide a novel and improved power lift in which two crank arms extend on the opposite sides of the tractor and are operatively connected to a three row middle buster frame pivoted to and extending under the tractor whereby the adjustment of the outer earth working tools may be effected in conformity with the adjustment of the tread of the rear traction wheels.

These and other objects are accomplished by providing a construction and an arrangement of the various parts in the manner hereinafter described and particularly pointed out in the appended claims.

Referring to the drawings:

Fig. 1 is a side elevational view partly in cross section showing the conventional form of tractor having my improvements embodied therein;

Fig. 2 is a top plan view of the same;

Fig. 3 is an enlarged fragmentary cross sectional view showing details of the power lift mechanism;

Fig. 4 is a cross sectional view taken on the line 4—4 in Fig. 2;

Fig. 5 is an enlarged perspective view of the clutch pawl;

Fig. 6 is a longitudinal cross sectional view of the worm drive and the associated clutch mechanism; and Fig. 7 is a similar view showing the clutch dog tripped for engagement with the continuously rotating clutch member.

In illustrating one form of my invention, I have shown the same in connection with a conventional form of tractor which comprises a longitudinally extending tractor frame, generally indicated by the reference character 10. This frame comprises a rear transmission housing section, as shown at 11, and front section 12. The front end of the tractor is supported on the usual front steering wheels, generally indicated by the reference character 13, and laterally adjustable rear traction wheels 14. Mounted on the front section 12 of the tractor frame is the usual internal combustion engine 15, which operatively drives the main transmission shaft 16 and through the conventional transmission mechanism generally indicated by the reference character 17. This transmission mechanism in turn drives the rear traction wheels in a manner well understood in the art. Secured to the main transmission shaft 16 is a pinion 18 which in turn, meshes with and operatively drives a gear 19 secured to a longitudinally extending power take off shaft 20, which is generally used for the purpose of transmitting power to implements attached to or drawn by the tractor.

One of the essential features of the present invention is the provision of a simple, compact and efficient power lift mechanism for raising and lowering implements, attached to or carried by the tractor, into and out of engagement with the ground.

This novel power lift mechanism is in the form of a unit mounted within a housing, generally indicated by the reference character 21, which is formed as a part of the steering gear housing 22 as a unit and secured to the upper portion of the rear tractor frame 11. Mounted within the housing and preferably in suitable bearings formed integrally therewith, is a lifting shaft 23, which extends outwardly on the opposite sides of the housing and has secured on the opposite ends thereof, lifting cranks 24. Journaled on the shaft 23 within the housing 20 is a worm wheel 25 which in turn meshes with and is operatively driven by a worm 26 formed integrally with the power take-off shaft 20 at a position adjacent the forward end thereof. The power take-off shaft 20 is operatively geared to the main transmission shaft 16 by means of a pinion 18 secured to the shaft 16 and a gear 19 splined to the power take-off shaft 20. Obviously suitable shifting mechanism may be provided for by shifting the gear 19 into and out of engagement with the pinion 18 so as to control the operation of the power take-off shaft and power lift mechanism. Formed integrally with the worm wheel 25 and located on one side thereof is a clutch member, as shown at 28, which is provided with a plurality of internal clutch grooves, as shown at 29, which are adapted to be engaged by a clutch dog hereinafter described. This clutch member 28 together with the worm wheel 25 forms in effect the continuously driven clutch member. Formed integrally with the shaft 23 adjacent one side of the clutch member 28 are three radially extending axially spaced apart arms 27, 30 and 31. Pivotally mounted at the outer ends of these arms 27, 30 and 31 by means of a pin 32 which extends through aligned apertures in these arms is a roller bracket or clutch dog 33. This clutch dog 33 comprises two outside parallel portions 34 and 35 which are connected by an angularly disposed transverse rib 36. The dog is normally pressed outwardly with respect to the shaft 23 by means of a spring generally indicated by the reference character 37. The spring 37 is provided with several coils, which embrace the pin 32 between the arms 30 and 27. The free ends of the spring engage respectively one side of the shaft 23 and the inner edge of the transverse rib 36 of the pawl 33 as clearly shown in Figs. 6 and 7 of the drawings. Journaled on the outer end of the clutch dog 33 by means of a pin 38 is a roller 39 which is adapted to engage the clutch notches 29 of the continuously driven clutch member 28.

The power lift mechanism or clutch is adapted to make a half turn or move through an angular magnitude of 180° and automatically stop for the purpose of raising or lowering the implement attached to the tractor in the manner hereinafter described. Journaled in the bearing 40 formed in one side of the housing 21 is a roller trip arm, generally indicated by the reference character 41. Journaled on the free end of the crank portion 42 of the arm 41 is a trip roller 43 which is adapted to engage the upwardly curved or hooked portion 44 of the clutch dog 33 for disengaging the dog 39 from the clutch notches 29 of the continuously rotating clutch member 28. Secured to the outer end of the roller arm 41 is a manually operable trip lever 45 for operating the trip and disengaging the roller 43 from the clutch dog 33. Pivoted in a suitable bearing in the housing 21, forward of the trip arm 42, is a second trip arm, generally indicated by the reference character 46, for stopping the intermittently operating clutch member and shaft 23 when it has traversed an angular magnitude of 180°. Journaled in the lower end of this trip arm 46 is a roller 47 which in turn is adapted to engage the curved or hooked portion 44 of the clutch dog 33 when the clutch dog together with the shaft 23 travelled half way around or 180° from the positions shown in Fig. 6 and Fig. 7. Secured to the lower arm 46 is an upwardly extending lever 48 which has its free end connected by means of two links 49 to the lever 45, as shown at 50, at a point substantially in the center of the lever 45. Both of these lower arms 41 and 45 are normally depressed inwardly so that the rollers 43 and 41 are adapted to engage the dog 33 in the normal rotation of the intermittently operated clutch member by a spring 51, which is connected to the lever 48, as shown at 52, and to the lever 45 as shown at 53. It will be observed by examining Fig. 6 of the drawings that the spring 51 contracts so as to draw the levers 45 and 48 into the position that the roller arms 41 and 46 respectively are drawn inwardly towards the axis of the shaft 23 so that the respective rollers 43 and 47 are in the path of the curved surface or hooked portion 44 of the roller dog 33 so as to engage this pawl and depress it for the purpose of disengaging the roller 39 from the clutch grooves 29 of the continuously rotating clutch member 23. When the lever 45 is actuated or tipped to the position shown in Fig. 7, the roller 43 disengages from the dog 33 so as to permit the roller 39 to engage one of the notches 29 of the continuously rotating clutch member 28. It will also be noted that as the curved portions 44 of the dog 33 passes the roller 43, the spring 51 automatically returns both roller arms 41 and 46 with their respective dogs to the position shown in Fig. 6, and that when the dog reaches 180° of its angular movement, the roller 47 will then engage the dog 33 so as to disengage the intermittently driven clutch member from the continuously driven clutch member, thereby swinging the crank 24 secured to the opposite ends of the shaft 23 from the full line position shown in Fig. 1 to the dotted line position for lowering the attached implement to its dotted line position as shown in this figure.

Another essential feature of the present invention involves the novel single implement frame of rigid construction extending beneath the tractor frame between the front steering and rear traction wheels of the tractor so as to extend the width of the tread of the tractor with the frame thereof adjustable to and with the width of the rear traction wheels. This novel arrangement includes the transversely extending implement supporting beam 54 secured to the front portion of the tractor, in any well known manner, at a point rearwardly of the axis of the front steering wheel and a rearward transversely extending beam 55 secured to an intermediate portion of the tractor, in any well known manner, at a point forwardly of the axis of the rear traction wheel. The implement, here shown, is a three row middle buster, as shown at 56, 57 and 58 with the two outside earth working tools 57 and 58 being in alignment with the tread of each of the rear traction wheels and the center earth working tool being located in the longitudinal center and underneath the tractor frame. Each of these earth working tools are provided with longitudinally extending beams 59. Secured to the inner side of each of the two outside beams is a substantially U-shaped bracket 60 and secured to the center beam 59 on the opposite sides thereof is an outwardly extending substantially U-shaped bracket 61. These U-shaped brackets 60 and 61, for each of the beams, are adjustably connected together by transverse frame members 62 and are provided with a plurality of apertures 63 for the purpose of extending the two outside earth working tools 56 and 58 with respect to the center tool when it becomes desirable to widen the tread of the rear traction wheels 14. This frame construction including the U-shaped members 60 and 61 together with their connecting frame members 62 forms substantially a rigid frame or implement of the three row middle buster type. The outer beams 59 are adjustably supported on the front transverse supporting beam 54 by downwardly and forwardly extending hangers 64 which are adjustably clamped to the transverse beams 54 by clamping bolts 65. Each of these beams 59 is pivotally connected, as shown at 68, to a triangularly shaped bracket 69 which has its lower end secured to the beams and extends upwardly therefrom. The lower links 67 are pivotally connected, as shown at 70, to the forward ends of each of the beams. Each of these outside beams are provided with adjustable gauge wheels 71 for regulating the depth penetration of the three earth working tools or middle buster. Each of the hangers 64 are provided with adjustable gauge wheels 71 for regulating the depth penetration of the three earth working tools or middle buster. Each of the hangers 64 are provided with a pair of braces 72 located on the opposite sides of each beam and extending from the rear transverse supporting beam 55 forwardly and downwardly to the lower end of each hanger as clearly shown in Fig. 1 and Fig. 2 of the drawings. The rear ends of these two outside beams 59 are connected by means of a bracket 73 and chains 74 to a crank arm 75 adjustably secured to the outer ends of each of the rock shafts 76 located on the opposite sides of the tractor. The rock shafts are square in cross section and are journaled in suitable bearings 77 carried by the rear transverse beam 55. Formed on the inner ends of each of the rock shafts 76 are crank arms 78 which in turn are connected by link connections 79 to the free ends of each of the oppositely arranged cranks 24 of the power lift mechanism.

Summarizing the operation of my improved power lift mechanism and single rigid frame middle buster construction, let us assume that the power lift mechanism and implement are in the full line position shown in Fig. 1 of the drawings, and that the operator is desirous of lowering the implement to its operative position or the dotted line position shown in Fig. 1. The trip lever 45 is moved rearwardly to disengage the pawl 43 from the curved portion 44 of the clutch dog 33 to thereby permit the roller 39 of the clutch dog to engage one of the notches 29 of the continuously driven clutch member 28 by the action of the spring 37 thereby positively driving the shaft 23 and with it the cranks 24 from the full line position shown in Fig. 1 to the dotted line position shown in this figure, causing the rock shafts 76 with its cranks 78 and 75 to move from the full line position shown in Fig. 1 to the dotted line position, thereby lowering the middle buster from the full line position shown in this figure to the dotted line position. When the shaft 23 has revolved 180° the roller 47 then engages the roller dog and disconnects the continuously operating clutch member from the intermittently driven clutch member and retains the implement in its lowered or operative position until the lever 45 is again tripped to return the implement to its inoperative or lifted position.

From the above description it will be readily seen that I have not only provided a simple, compact and efficiently operative power lift mechanism, but also a novel three row middle buster in which the rigid frame thereof extends substantially the width or tread of the tractor and is adjustable with the rear traction wheels thereof so that the outer earth working tools thereof may be aligned with the adjusted tread of the rear traction wheels.

It will be further noted that by positioning the power lift mechanism forwardly of the operator's seat on the tractor and at a point above the power take-off shaft and transmission mechanism, the operative connections to raise and lower implements are short and the whole mechanism for accomplishing this function extremely compact.

While in the above specification I have described one embodiment which my invention may assume in practice, it will of course be understood that modification may be made without departing from the spirit and scope of the invention as expressed in the following claims.

What I claim is my invention and desire to secure by Letters Patent is:

1. In an implement of the class described, in combination with a tractor having a motor for propelling the same, said tractor having front steering and laterally adjustable rear traction means, a power lift mounted on said tractor and driven by said motor, cranks located on the opposite side of the tractor forming a part of said power lift, an implement frame extending transversely across and under said tractor having its forward ends pivotally connected to said tractor and extending substantially the width of the tread of the rear traction wheels, and means for adjusting said frame in accordance with the width of said traction means said implement frame connected to said cranks for raising and lowering the same.

2. An agricultural implement of the class described, in combination with a tractor having front steering and laterally adjustable rear traction means, a power lift for said tractor, a rigid implement frame pivotally connected to the tractor rearwardly of the axis of the front steering means and extending beneath the tractor, said frame adjustable so as to extend substantially the width of the tread of the rear traction means, and connections operatively connecting the said power lift mechanism with said frame for raising and lowering said frame.

3. An agricultural implement comprising, in combination with a wheeled frame, a supplemental rigid frame extending beyond the width of and under said wheeled frame, said rigid frame being pivotally connected at its forward end to said wheeled frame, spaced apart middle busters carried by said supplemental frame, gauge wheels carried by said supplemental frame for gauging the depth penetration of said middle busters, cranks located on the opposite sides of said wheeled frame and connected to the rear end of said supplemental frame, and means for operating said cranks for raising and lowering the supplemental frame.

4. An agricultural implement of the class described, in combination with a tractor having front steering means and spaced apart adjustable rear traction means, said tractor having a power lift, including cranks on the opposite sides of said tractor, a rigid implement frame carried between said front steering and rear traction means and extending beneath the tractor, said frame extending substantially the width of the tread of the rear traction means, said implement frame adjustable laterally in conformity with the adjustment of the rear traction means, and means operatively connecting said frame to said cranks.

5. An agricultural implement of the class described comprising, in combination with a tractor having front steering means and rear spaced apart adjustable traction wheels, a laterally adjustable rigid implement frame extending beneath the tractor and having its forward ends pivotally connected thereto, middle busters secured to said frame in spaced apart relation so that the outside middle busters travel in longitudinal alignment with the tread of the rear traction wheels, a center middle buster located in the longitudinal center of and beneath the tractor, said tractor having power lift mechanism including cranks located on the opposite sides of the tractor and operatively connected to said frame, means for driving said cranks for raising and lowering said frame, and adjustable gauge wheels connected to said frame for gauging the depth penetration of said middle busters into the ground.

6. An agricultural implement of the class described, in combination with a tractor having front steering and adjustable rear traction means, a power lift for said tractor, a rigid implement frame pivotally connected to the tractor rearwardly of the axis of the front steering means and extending beneath the tractor, said frame being adjustable in width so as to extend substantially the width of the tread of the rear traction means, cranks formed as a part of said power lift mechanism located on the opposite sides of said tractor, and connections operatively connecting the said cranks with the rear end of said frame for raising and lowering said frame.

7. An agricultural implement of the class described, in combination with a tractor having front steering means and spaced apart adjustable rear traction means, said tractor having a power lift, including cranks on the opposite sides of said tractor, a rigid implement frame carried between said front steering and rear traction means and extending beneath the tractor, said frame extending substantially the width of the tread of the rear traction means, said implement frame adjustable laterally in conformity with the adjustment of the rear traction means, and means operatively connecting the rear end of said frame to said cranks.

8. An agricultural implement of the class described comprising, in combination with a tractor having front steering and rear spaced apart adjustable traction wheels, a rigid three row middle buster frame supported beneath said tractor between the front steering and rear traction wheels, said frame being adjustable so as to conform to the width of said traction wheels, parallel link mechanism pivotally connecting the forward ends of said middle buster frame to said tractor, said tractor having a power lifting mechanism including cranks located on the opposite sides of said tractor and operatively connected to the rear end of said middle buster frame for raising and lowering it with respect to the ground, and gauge wheels adjustably connected to the outside forward portions of said middle buster frame for regulating the depth penetration of all of said middle busters.

9. The combination with a tractor having front steering and rear traction means, a steering post mechanism mounted on said tractor, a power lift mechanism formed as a unit with said steering post mechanism, cranks located on the opposite sides of said tractor forming a part of said power lift mechanism, and an implement attached to said tractor and connected at the opposite sides to said cranks for raising and lowering said implement.

10. The combination with a tractor having front steering and rear traction means, a power lift mechanism located in the longitudinal and transverse center of said tractor and having cranks projecting from the opposite sides thereof, and an implement attached to said tractor and connected to said cranks for raising and lowering said implement.

11. The combination with a tractor having front steering and rear traction means, a motor for propelling said tractor, a transmission mechanism, a power take-off shaft located above and operatively connected to said transmission mechanism, a worm carried by said power take-off shaft, a power lift mechanism located above said power take-off shaft and geared to said worm, and an implement attached to said tractor between said front steering and rear traction means and connected to said power lift mechanism for raising and lowering said implement.

12. The combination with a tractor having front steering and rear traction means, a motor for propelling said tractor, a forward transverse implement supporting beam secured to said tractor adjacent the front end thereof, a second implement supporting beam secured to said tractor adjacent the center thereof, an implement including a rigid frame extending under the tractor and attached to the forward beam between the front steering and rear traction means, movable connections carried by said rear beam and connected to said implement, and a power lift mechanism located adjacent said rear beam having cranks located on the opposite sides of said tractor and connected to said movable connections for raising and lowering said implement.

13. The combination with a tractor having front steering and adjustable rear traction means, a motor for propelling said tractor, forward and rearward transverse implement supporting beams secured to said tractor, one of said beams secured to said tractor adjacent the front end thereof, the other of said beams secured to said tractor adjacent the center thereof, an implement attached to the forward beam, said implement in the form of a rigid frame adjustable in width to conform to the width of the rear traction means movable connections carried by said rear beam and connected to said implement, a transmission mechanism for connecting said motor with said traction means, a power take-off shaft located above and operatively connected to said transmission mechanism, and a power lift mechanism located above and driven by said power take-off shaft, said power lift mechanism having cranks located on the opposite sides of said tractor and connected to said movable connections for raising and lowering said implement.

14. The combination with a tractor having front steering and rear traction means, a motor for propelling said tractor, forward and rearward transverse implement supporting beams secured to said tractor, one of said beams secured to said tractor adjacent the front end thereof, the other of said beams secured to said tractor adjacent the center thereof, a single rigid implement frame pivotally attached at its opposite sides to the forward beam, movable connections carried by said rear beam and connected to said implement, a power lift mechanism located adjacent said rear beam and having cranks located on the opposite sides of said tractor, said cranks having relatively short connections with said movable connections for raising and lowering said implement.

15. An agricultural implement of the class described comprising, in combination with a tractor having front steering and rear spaced apart traction wheels, means for laterally adjusting said rear traction wheels, a three row middle buster frame supported beneath said tractor between the front steering and rear traction wheels, parallel link mechanisms pivotally connecting the forward ends of said middle buster frame to said tractor, said tractor having a power lift mechanism including cranks located on the opposite sides of said tractor and operatively connected to said middle buster frame for raising and lowering it with respect to the ground, means for permitting the adjustment of said frame to conform to the adjustment of said traction wheels, and gauge wheels adjustably connected to said middle buster frame for regulating the depth penetration of all of said middle buster.

HERMAN E. ALTGELT.